United States Patent Office 3,165,941
Patented Jan. 19, 1965

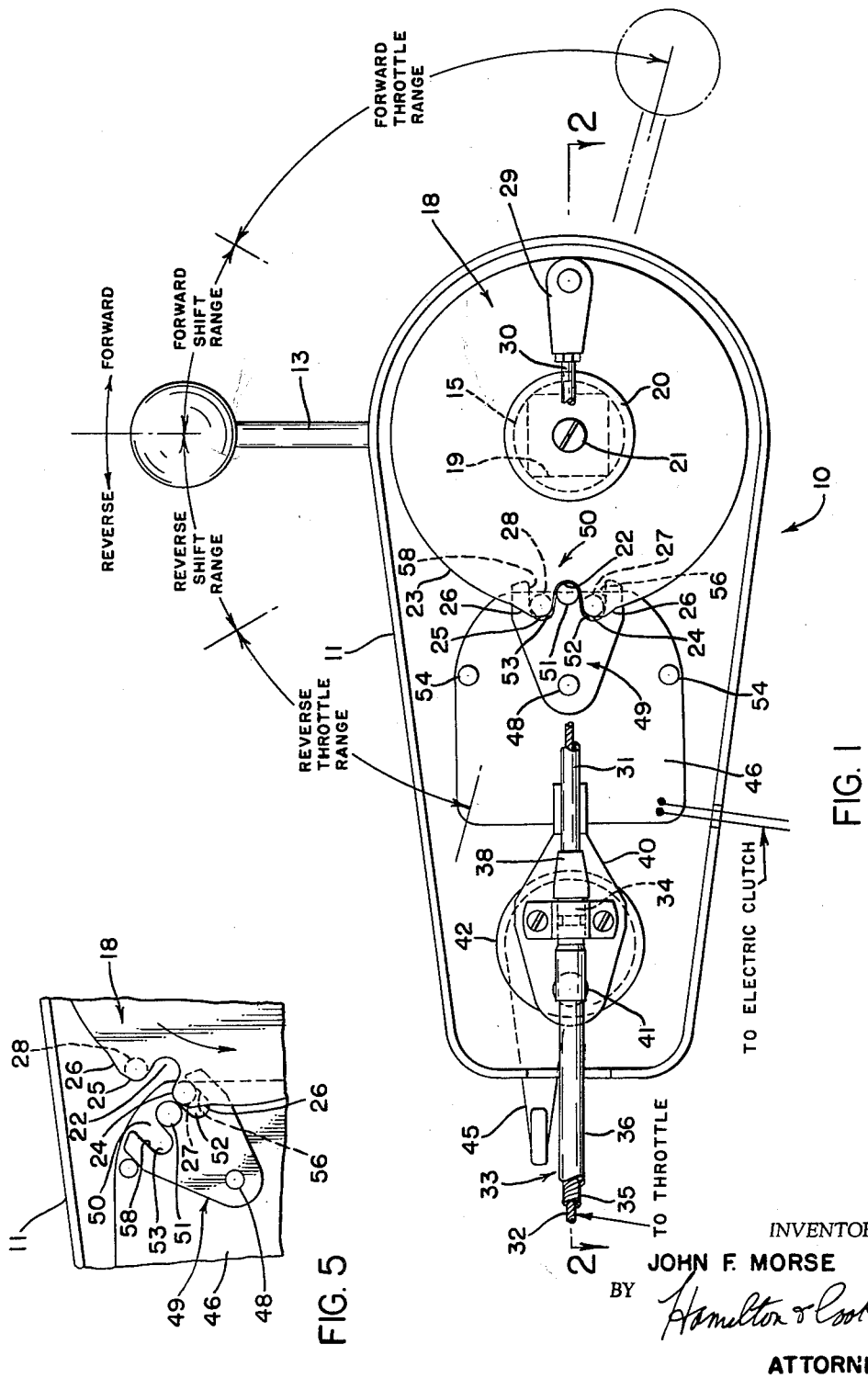

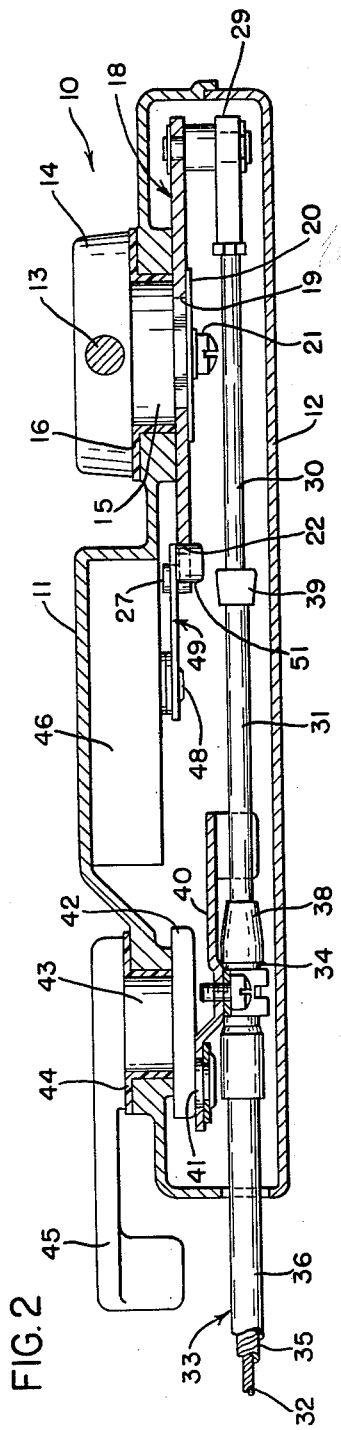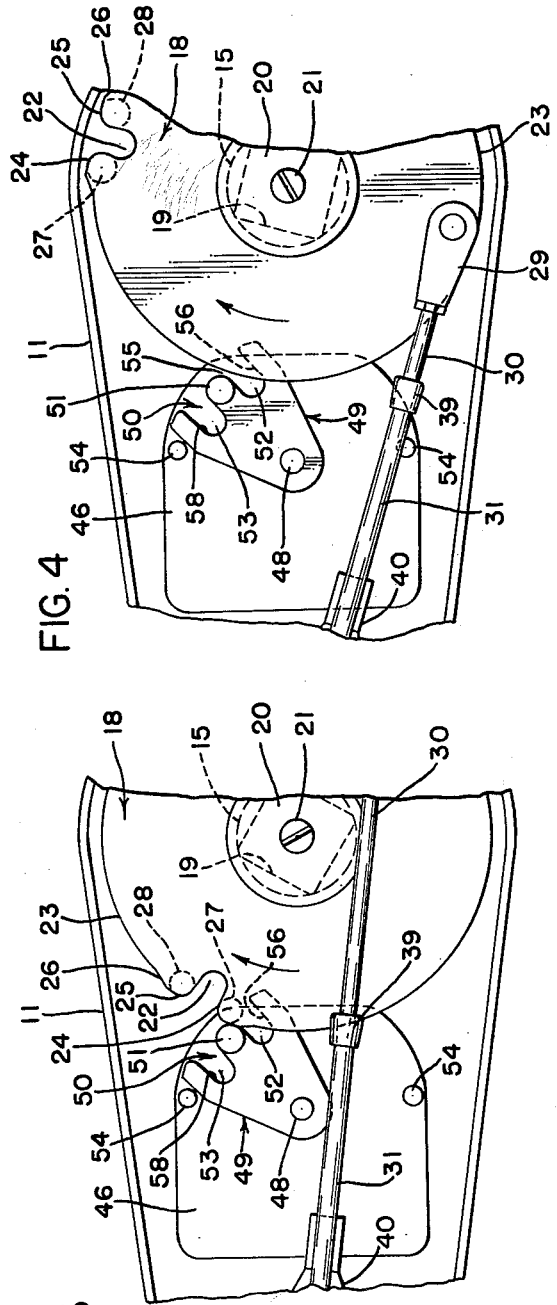

3,165,941
SINGLE LEVER CONTROL FOR A THROTTLE AND AN ELECTRICALLY OPERATED CLUTCH
John F. Morse, 21 Clinton St., Hudson, Ohio
Filed Feb. 26, 1962, Ser. No. 175,570
17 Claims. (Cl. 74—472)

The present invention relates generally to single lever control units adapted for operating both the throttle and the clutch of an internal combustion engine. More particularly, the present invention relates to an improved and simplified mechanism for sequentially operating the throttle and an electrically actuated clutch.

Clutch mechanisms may be of several types, such as disk, dog or spring. Electrically driven actuators are available to operate various types of clutches. Certain types of electrically actuated clutches may require a continuous, uninterrupted flow of electric power to maintain the clutch elements in engagement.

With the use of such an actuator, however, there are two dangerous conditions that must be prevented: First, simultaneous energization of the forward and reverse clutch mechanisms, and, second, accidental interruption of the electrical current flow to the clutch actuator.

In the first case, if both forward and reverse clutch mechanisms were actuated simultaneously, destruction of the power transmission system would result.

In the second case, if there was an interruption of the current flow to the clutch actuator, particularly at medium or higher speeds, the clutch would disengage and under this no-load condition the engine would race beyond safe operating limits. Moreover, if the interruption of the current flow were only momentary, the re-energization of the clutch actuator while the engine was operating at higher speeds might damage the clutch mechanism.

Such temporary interruption of the current flow to the clutch actuator can be caused by corrosion of electrical contacts. Although switches can be built to be substantially sealed, the phenomenon of contact corrosion is always a present threat, especially in marine service to which the present control is particularly adapted.

In the prior art devices with which the applicant is familiar, the switch which controls the current flow to the clutch actuating mechanism is continuously interconnected to the mechanism of the single lever control in such a manner that movement of the control lever, even through the advanced throttle range, effects some relative movement between the contacting elements of the switch. My prior U.S. Patent No. 2,966,970 is exemplary of such a control.

It is therefore an object of the present invention to provide an improved single lever control unit for sequentially operating the throttle of an internal combustion engine by mechanical means and the clutch by electrical means.

It is a further object of the present invention to provide a single lever control unit, as above, which energizes and de-energizes the clutch mechanism by a switch which is mechanically operated by the control lever as it is moved through the shifting range and is mechanically disconnected, or isolated, from the control lever as the latter is moved beyond the shifting range through the advanced throttle range.

A further object of the present invention is to provide a single lever control unit, as above, which has a novel interlock which prevents operation of the clutch actuating switch during certain positions of the throttle actuating mechanism.

It is a still further object of the present invention to provide a single lever control unit for operating an electrical clutch which is so constructed as to prevent simultaneous actuation of the forward and reverse clutch mechanism.

These and other objects which will become apparent from the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In general, the present invention provides coordinated control of the engine throttle and clutch controls through the entire range of operation, the direction of rotation of the control lever from neutral selectively engaging forward or reverse gear, and rotation of the control lever beyond the shifting range advancing the throttle as desired. In the preferred embodiment, the control lever is operatively connected to rotate a substantially circular wheel drive member. The throttle control cable is displaced by the rotation of the wheel drive member. The electrical clutch actuating mechanism is energized through a switch, the actuating means of which is operated by rotation of the wheel drive member. The operation of the switch is accomplished during initial rotation of the wheel drive member as the control lever is selectively rotated from neutral, to engage either forward or reverse gear. The wheel drive member then no longer contacts the switch actuating means as the former is further rotated to advance the throttle. As the control lever is returned to neutral, the wheel drive member re-engages the switch actuating means and operates it to break the circuit to the electrical clutch actuating mechanism to disengage the forward or reverse gear. This coordination of the wheel drive member and the switch actuating means is obtained by the interaction of suitable engaging means therebetween. In the preferred embodiment of the invention this comprises an omega shaped or lobated cam surface on the switch actuating means with two circumferentially spaced pick-up pins at the periphery and parallel to the rotational axis of the wheel drive member to break the circuit and disengage the clutch from forward or reverse gear and by the interaction of a cam pin mounted at the central apex of the lobated cam surface with cammed indentations in the periphery of the wheel drive member between the spaced pick-up pins to make the circuit and engage the clutch in forward or reverse. Irrespective of the particular engaging means used the wheel drive member and switch actuating means are so constructed as to prevent any contact therebetween except during that portion of rotation of the wheel drive member when the switch actuating means is being operated to make or break the energizing circuit of the clutch actuating mechanism.

Referring to the drawings:

FIG. 1 is a rear side elevation of a single lever control unit embodying the invention with the cover plate removed, showing the control lever in neutral position.

FIG. 2 is an enlarged cross section taken substantially on line 2—2 of FIG. 1.

FIG. 3 is a fragmentary area of FIG. 1 showing the wheel drive member having been moved through forward shift range.

FIG. 4 is a fragmentary area of FIG. 1 similar to FIG. 3 showing the wheel drive member having been moved through forward throttle range.

FIG. 5 is a fragmentary area of FIG. 1 showing the wheel drive member just prior to being returned through forward shift range toward neutral.

The control unit, designated generally by the numeral 10, has a housing 11 to which a rear plate 12 may be attached. The rear plate 12 is adapted to be attached to the control stanchion of a boat not shown.

A control lever 13 extends radially outwardly of hub 14 which is formed on the axially outer end of a control shaft 15. Shaft 15 is journaled in housing 11 and a flanged sleeve bearing 16 is preferably interposed between shaft 15 and housing 11.

A wheel drive member 18 is non-rotatably secured to shaft 15, as by fitting the square hole 19 in the wheel drive member 18 on the squared axially inner end of shaft 15 to rotate therewith about their common axis.

A retaining washer 20 is detachably mounted to the axially inner end of shaft 15, as by a screw 21, and can be tightened against the wheel drive member 18 to secure it in place. An indentation 22 on the peripheral edge of rim 23 is defined by a cammed surface which extends radially outwardly of indentation 22 over substantially arcuate protuberances 24 and 25 on the rim, one on each side of the indentation and returns to the rim 23 of the drive member in gently inclined ramp portions 26.

Circumferentially spaced pick-up pins 27 and 28, one on each side of the identation 22, extend perpendicularly inwardly of the plane of drive member 18 from the protuberances 24 and 25.

A swivel connection 29 is provided on the axially outer side of the wheel drive member 18 in proximity to the peripheral edge of rim 23 and is attached to the end of a push rod 30 which telescopes within a sleeve 31. Push rod 30 is attached by a suitable means, not shown, to the end of the core 32 of a push-pull cable 33 for operating a throttle. In the neutral position of FIG. 1, the push rod passes over the center or axis of the wheel drive member 18. Sleeve 31 has a swivel connection with the front end of a mounting bushing 34 secured to the sheath 35 for cable core 32. Sheath 35 preferably has a plastic cover 36. Resilient sealing sleeves 38 and 39, which act as a moisture seal, may be provided at the joints between the bushing 34 and sleeve 31, and at the juncture of the sleeve 31 and the push rod 30, respectively.

It is readily apparent that by locating the swivel connection 29 180° from the position shown in FIG. 1, when the throttle is in neutral position, the unit can easily be adapted to operate a "pull-to-open" rather than a "push-to-open" throttle.

The mounting bushing 34 is secured in a swivel clip 40 which is in turn pivotally mounted, at 41, on an eccentric plate 42 on the axially inner end of auxiliary throttle control shaft 43. The auxiliary throttle control shaft 43 is also journaled in housing 11 and a flanged sleeve bearing 44 is also preferably interposed between the shaft 43 and the housing 11. An auxiliary throttle control lever 45 extends radially outwardly of the axially outer end of shaft 43. Rotation of the auxiliary throttle control lever 45 thus causes the control cable sheath 35 to move in an opposite direction to the movement of the cable core 32 to effect advancements of the throttle for warm-up of the engine, without operating the main lever 13. A more detailed disclosure of this concept is set forth by U.S. Patent No. 2,987,152.

Also mounted on the interior of housing 11 is rotary type switch 46 having two or more positions. A multiple position slide type switch could be substituted for switch 46 so long as the actuating means is capable of being operatively moved to the various positions by the rotation of wheel drive member 18. The switch 46 is incorporated in the electrical circuit to the clutch actuator which, when energized, holds the clutch in either forward or reverse, and which, when de-energized, causes the clutch to disengage.

Non-rotatably secured to the rotor shaft 48 on switch 46 is a switch actuator or throw arm 49 which extends toward and partially behind wheel drive member 18. On the end of the switch throw arm 49 is a lobated cam, indicated generally by the numeral 50. A cam pin 51 extends perpendicularly outwardly of arm 49 at the central apex of cam 50. Cam pin 51 is adapted to cooperate with the cam surface defining the indentation 22 in the outer surface of protuberances 24 and 25.

Because of the converse interaction of the elements comprising the control units in forward and reverse range, the operation of the unit will only be described through forward range.

In the neutral or FIG. 1 position, the cam pin 51 rests within indentation 22 and the pick-up pins 27 and 28 are embraced within recesses 52 and 53 of cam 50, respectively.

When the control lever 13 is rotated from neutral approximately 30° in either direction, only a slight displacement of push rod 30 and cable core 32 is caused because wheel drive member 18 and push rod 30 are swinging in the same general direction on different arcs. This slight displacement is normally absorbed by the backlash of the cable and the throttle linkage to which the cable is attached at the engine, without causing advance of the throttle. In this range of movements, the cammed surface of indentation 22 pivotally drives switch throw arm 49 via its engagement with cam pin 51 as the switch throw arm is pivotally rotated counter the rotation of wheel drive member 18 to close the switch and make the circuit which energizes the mechanism to operate the clutch. A stop pin 54 is positioned to prevent the throw arm 49 from being rotated too far.

Continued rotation of the control lever 13 beyond the idle forward position depicted in FIG. 3, in which the forward gear has been engaged, will displace the throttle control cable core 32 to advance the throttle. This continued rotation of control lever 13 can impart no further movement to the switch throw arm 49, as is clearly shown in FIG. 4. By having the arcuate rim 23 of the wheel drive member 18 of lesser radius than the outer edge of protuberances 24 and 25, there is always a space 55 between the remainder of the wheel drive member 18 and the switch throw arm 49 as the control lever 13 is moved through the advanced throttle range. This space 55 precludes any possibility of further contact between drive member 18 and throw arm 49 which might result in transmitting any motion to the switch, thereby obviating the possibility of interrupted current supply to the clutch actuating mechanism, as, for example, that which might result from the adverse effect of contact corrosion.

Counter rotation of the control lever 13 from the forward throttle range to idle forward closes the throttle in preparation for shifting from forward to neutral. As the control lever 13 is rotated from idle forward toward neutral, pick-up pin 27 engages the initial engaging surface 56 of the lower recess 52 of cam 50. Because of the gentle incline of ramp portion 26, the sam pin 51 cannot possibly jam behind protuberances 24 or 25 to prevent proper engagement with indentation 22. When the control lever is rotated from idle reverse toward neutral, pick-up pin 28 similarly engages surface 58 on the upper recess 53 of cam 50.

It should now be apparent that the switch for an electrically operated clutch in a single lever control unit constructed according to the present invention is maintained in a stable electrical condition unaffected by manipulations of the throttle and, furthermore, that both forward and reverse clutch mechanisms cannot be simultaneously energized.

What is claimed is:

1. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch means, interconnecting means between said drive member and said switch actuating means to move said switch actuating means in response to the first portion of rotation from neutral of said drive member and to move said switch actuating means in a reverse direction during the return rotation to neutral of said drive member, and said drive member adapted to disconnect from said switch actuating means during continued rotation of said drive member beyond said first portion of rotation.

2. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch means interconnecting means between said drive member and said switch actuating means to move said switch actuating means in response to the first portion of rotation from neutral of said drive member, said drive member adapted to disconnect from said switch actuating means during continued rotation of said drive member beyond said first portion of rotation, and separate means on said drive member to move said switch actuating means in a reverse direction during return rotation to neutral of said drive member.

3. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch, interconnecting means on said drive member, mating interconnecting means on said switch actuating means, the interaction of said interconnecting means moving said switch actuating means in response to the first portion of rotation from neutral of said drive member and to move said switch actuating means in a reverse direction during the return rotation to neutral of said drive member, and said interconnecting means cooperating to disconnect said drive member from said switch actuating means during continued rotation of said drive member beyond said first portion of rotation.

4. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch, interconnecting means on said drive member, mating interconnecting means on said switch actuating means, the interaction of said interconnecting means moving said switch actuating means in response to the first portion of rotation from neutral of said drive member, said interconnecting means cooperating to disconnect said drive member from said switch actuating means beyond said first portion of rotation, and separate means on said drive member to move said switch actuating means in a reverse direction during return rotation to neutral of said drive member.

5. A single lever control unit for the throttle and electrically actuated clutch of an engine comprising, a control lever, a drive member rotatable by said control lever from a neutral position to operate a throttle, switch means for energizing and de-energizing said electrically actuated clutch, a switch actuator to operate said switch, interconnecting means on the outer periphery of said drive member, mating interconnecting means on said switch actuator, the interaction of said interconnecting means moving said switch actuator in response to the first portion of rotation from neutral of said drive member, part of said drive member being of lesser radius than the radius of said interconnecting means to provide a space between said drive member and said switch actuator during continued rotation of said drive member beyond said first portion of rotation.

6. A single lever control unit for the throttle and electrically actuated clutch of an engine comprising, a control lever, a drive member rotatable by said control lever from a neutral position to operate a throttle, switch means for energizing and de-energizing said electrically actuated clutch, a switch throw arm to operate said switch, means on the periphery of said drive member to move said switch throw arm during the first portion of rotation of said drive member from neutral position in either direction, said drive member and said switch throw arm being spaced apart during continued rotation of said drive member beyond said first portion of rotation, and separate means on said drive member to move said switch throw arm in a reverse direction during return rotation to neutral of said drive member.

7. A single lever control unit for the throttle and electrically actuated clutch of an engine comprising, a control lever having a neutral position and movable through a shifting range and then through a throttle advance range, a circular wheel drive member rotatable by said control lever to operate a throttle, switch means for engaging and disengaging said electrically actuated clutch, a switch actuator to operate said switch means, a cam indentation on the periphery of said wheel drive member, a protuberance on each side of said indentation, the radius of the periphery of the remainder of said wheel drive member being less than the radius of the outer edges of said protuberances, cam engaging means on said switch actuator adapted to interact with said cam indentation to move said switch actuator during rotation of said control lever through said shifting range, and separate means to return said switch actuator during return rotation of said control lever through said shifting range.

8. A single lever control unit for the throttle and electrically actuated clutch of an engine comprising, a control lever having a neutral position and movable through a shifting range and then through a throttle advance range, a circular wheel drive member rotatable by said control lever to operate a throttle, switch means for engaging and disengaging said electrically actuated clutch, a switch throw arm to operate said switch, a cam identation on the periphery of said wheel drive member, a protuberance on each side of said indentation, the radius of the periphery of the remainder of said wheel drive member being less than the radius of the outer edges of said protuberances, cam engaging means on said switch throw arm adapted to interact with said cam indentation to pivot said switch throw arm during rotation of said control lever through said shifting range, a lobated cam on said switch throw arm, and pick-up means on said wheel drive member, said pick-up means engaging said lobated cam to pivotally return said switch throw arm during return rotation of said control lever through said shifting range.

9. A single lever control unit for the throttle and electrically actuated clutch of an engine comprising, a control lever having a neutral position and movable through a shifting range and then through a throttle advance range, a circular wheel drive member having a peripheral rim and rotatable by said control lever to operate a throttle, switch means for engaging and disengaging said electrically actuated clutch, a switch throw arm to operate said switch, a cam indentation on the periphery of said wheel drive member, a protuberance on each side of said indentation, the radius of the periphery of the remainder of said wheel drive member being less than the radius of the outer edges of said protuberances, cam engaging means on said switch throw arm adapted to interact with said cam indentation to pivot said switch throw arm during rotation of said control lever through said shifting range, separate means to pivotally return said switch throw arm during return rotation of said control lever through said shifting range, and a ramp between the outer peripheral rim of said wheel drive member and the outer edge of said protuberances.

10. A single lever control unit for the throttle and electrically actuated clutch of an engine comprising, a control lever having a neutral position and movable through a shifting range and then through a throttle advance range, a circular wheel drive member rotatable by said control lever to operate a throttle, switch means for engaging and disengaging said electrically actuated clutch, a switch throw arm to operate said switch, a cam indentation on the periphery of said wheel drive member, a protuberance on each side of said indentation, the radius of the periphery of the remainder of said wheel drive member being less than the radius of the outer edges of said protuberances, a cam pin on said switch throw arm adapted to interact with said cam indentation to pivot said switch throw arm during rotation of said control lever through said shifting range, a lobated cam on said switch throw arm, pick-up means on said wheel drive member, said pick-up means engaging said lobated cam to pivotally return said switch throw arm during return rotation to neutral through said shifting range.

11. A single lever control unit for the throttle and electrically actuated clutch of an engine comprising, a control lever having a neutral position and movable through a shifting range and then through a throttle advance range, a circular wheel drive member rotatable by said control lever to operate a throttle, switch means for engaging and disengaging said electrically actuated clutch, a switch throw arm to operate said switch, a cam indentation on the periphery of said wheel drive member, a protuberance on each side of said indentation, the radius of the periphery of the remainder of said wheel drive member being less than the radius of the outer edges of said protuberances, a cam pin on said switch throw arm adapted to interact with said cam indentation to pivot said switch throw arm during rotation of said control lever through said shifting range, a lobated cam on said switch throw arm, pick-up means on said wheel drive member, said pick-up means engaging said lobated cam to pivotally return said switch throw arm during return rotation to neutral through said shifting range, and a ramp between the outer peripheral rim of said wheel drive member and the outer edges of said protuberances.

12. A single lever control unit for the throttle and electrically actuated clutch of an engine comprising, a control lever having a neutral position and movable through a forward and reverse shifting range and a forward and reverse throttle advance range, a circular wheel drive member having a peripheral rim and rotatable by said control lever to operate a throttle, switch means for energizing and de-energizing said electrically actuated clutch, a switch throw arm to operate said switch, a cam indentation on the peripheral rim of said wheel drive member, a protuberance on each side of said indentation, a pick-up pin on each side of said cammed indentation extending perpendicularly from said wheel drive member, one from each protuberance, the radius of the periphery of the remainder of said wheel drive member being less than the radius of the outer edges of said protuberances, a cam pin on said throw arm adapted to interact with said cam indentation to pivot said switch throw arm during rotation of said control lever through either of said shifting ranges, a lobated cam on said switch throw arm, slanted engaging surfaces on said lobated cam, said pickup pins selectively engaging said slanted engaging surfaces on said lobated cam to pivotally return said switch throw arm during return rotation of said control lever through said shifting ranges.

13. A single lever control unit for the throttle and electrically actuated clutch of an engine comprising, a control lever, a drive member rotatable by said control lever from a neutral position to operate a throttle, a circular portion on said drive member, switch means for energizing and de-energizing said electrically actuated clutch, a switch actuator to operate said switch means, means on said drive member to move said switch actuator during the first portion of rotation of said drive member from neutral position, at least one protuberance on the periphery of said circular portion, said protuberance so placed as to contact said switch actuator at the end of said first portion of rotation of said drive member, the radius of the periphery of part of said circular portion being less than the radius to the outer edge of said protuberance so as to permit a space between said drive member and said switch actuator during at least a portion of rotation of said drive member beyond said first portion of rotation.

14. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch, interconnecting means between said drive member and said switch actuating means to move said switch actuating means in response to the first portion of rotation from neutral of said drive member and to move said switch actuating means in a reverse direction during the return rotation to neutral of said drive member, and means for providing disconnection between said drive member and said switch actuating means during continued rotation of said drive member beyond said first portion of rotation.

15. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch means, means between said drive member and said switch actuating means to move said switch actuating means in response to the first portion of rotation from neutral of said drive member and to move said switch actuating means in a reverse direction during the return rotation to neutral of said drive member, and means to effect a disconnect between said switch means and said drive member during continued rotation of said drive member beyond said first portion of rotation.

16. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch means, interconnecting means between said drive member and said switch actuating means to move said switch actuating means in response to the first portion of rotation from neutral of said drive member, means to move said switch actuating means in a reverse direction during the return rotation to neutral of said drive member, and means to effect a disconnect between said switch means and said drive member during continued rotation of said drive member beyond said first portion of rotation.

17. A single lever control unit for the throttle and electrically actuated clutch of an engine comprising, a control lever, a drive member rotatable by said control lever from a neutral position to operate a throttle, switch means for energizing and de-energizing said electrically actuated clutch, switch actuating means to operate said switch means, interconnecting means between said drive member and said switch actuating means to move said switch actuating means in response to the first portion of rotation from neutral of said drive member, said switch actuating means movable in a reverse direction during the return rotation to neutral of said drive member, and means to effect a disconnect between said switch means and said drive member during continued rotation of said drive member beyond said first portion of rotation.

References Cited in the file of this patent

UNITED STATES PATENTS

| | | |
|---|---|---|
| 2,238,574 | Thomas et al. | Apr. 15, 1941 |
| 2,540,427 | Charles et al. | Feb. 6, 1951 |
| 2,588,649 | Morse | Mar. 11, 1952 |
| 2,949,988 | Morse | Aug. 23, 1960 |